Patented Nov. 24, 1936

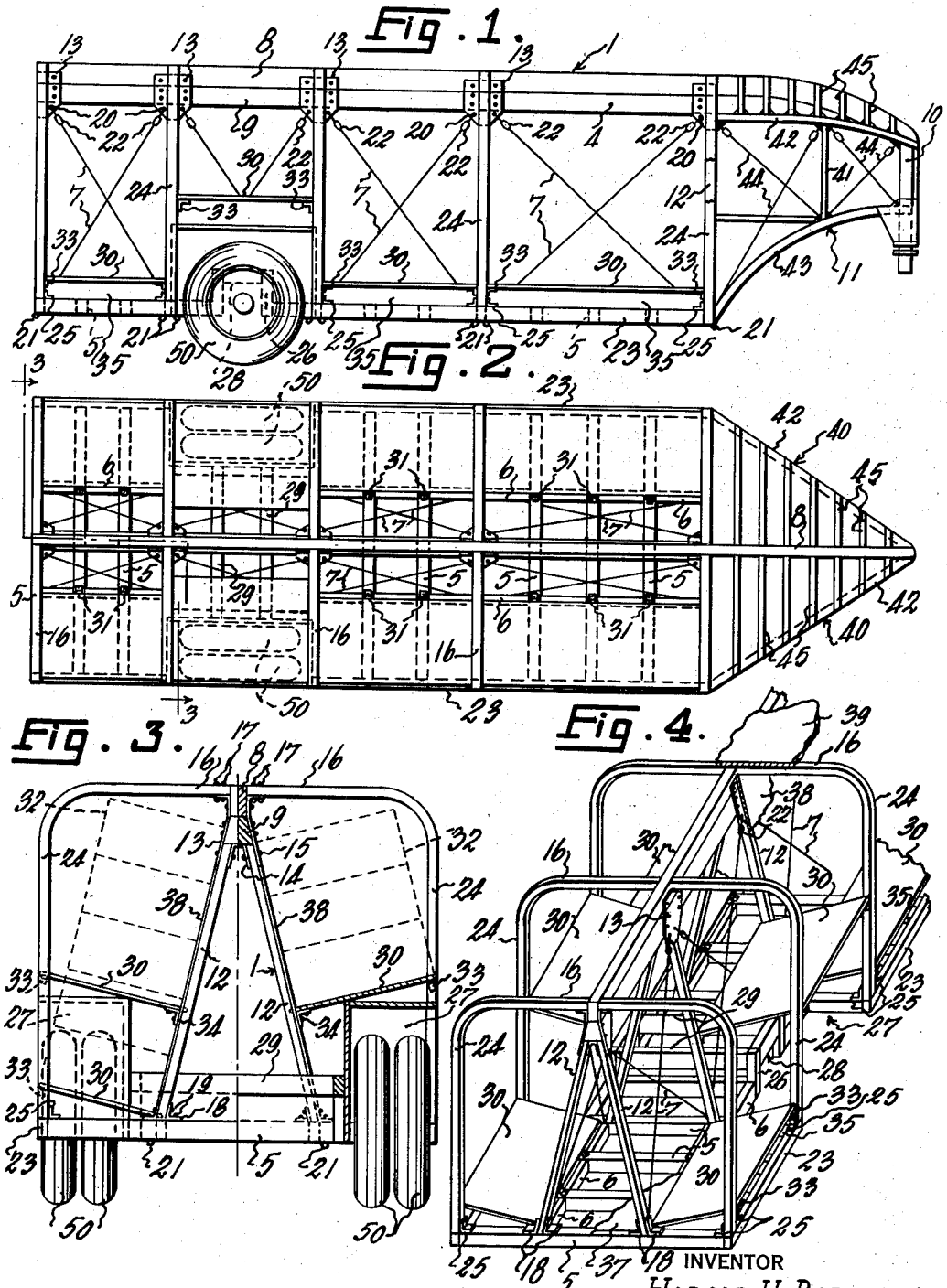

2,061,673

UNITED STATES PATENT OFFICE 2,061,673

TRAILER VEHICLE

Harold H. Robinson, Coral Gables, Fla., assignor to Curtiss Aerocar Company, Inc., Coral Gables, Fla., a corporation of Florida Application September 11, 1933, Serial No. 688,912

1 Claim. (Cl. 296—28)

This invention relates to trailer vehicles, more particularly to the semi-trailer type, adapted for carrying cased goods, such as cases of bottles, groceries and the like.

One object is to provide a simple and inexpensive construction in which the body frame is so constructed as to serve as the vehicle chassis and in which such frame is so arranged and formed as to render all portions of the load easily accessible in loading and unloading and to position the cases or other elements which make up the load in stable relation to the vehicle and each other. My construction also provides a relatively low center of gravity for the loaded vehicle.

Other and further objects will be apparent from the following specification and claim.

In the accompanying drawing which illustrates one embodiment of my invention,

Fig. 1 is a side elevation showing the frame structure, the body coverings being removed;

Fig. 2 is a plan view of the structure shown in Fig. 1;

Fig. 3 is a rear elevational view, on a larger scale, partly in section along the line 3—3 of Fig. 2; and Fig. 4 is a fragmentary perspective view of the body framing.

Referring to the drawing, the body and chassis frame as shown comprises a centrally positioned longitudinally extending prismatic girder indicated generally by the reference character 1. Girder 1 is formed of two inclined trusses having a common upper chord 4 and diverging downwardly to transverse floor beams 5 which are continuous from side to side, their outer portions extending as cantilevers from the base of the girders. The lower chords of the trusses are formed of sections 6 which with the intervening portions of the floor beams form continuous compression elements, that acquire their compressive stress through the tension of truss diagonal wires 7.

The upper chord 4 is composed of two members 8 and 9. Top member 8 is rectangular in cross section and extends the full length of the vehicle, being curved downwardly at its forward end to join the upper end of a nose or prow post 10, which serves as a means of connection to a towing vehicle. The lower member 9 of chord 4 is trapezoidal in cross section, the angularity of its sides being made in accordance with the desired spread of the trusses. Member 9 extends the length of the main body portion of the vehicle only, stopping at the foremost truss post 12. The truss posts 12 are attached to the member 9, with their ends in abutting relation with the under side of said member, by bent steel plates 13 secured to the outer sides of the posts and member 9 and by inverted V-shaped plates 14 engaging the under face of member 9 and the inner faces of the posts, rivets or bolts 15 holding the parts together. Plates 13, in addition to maintaining posts 12 in position also serve to hold the members 8 and 9 together as best shown in Fig. 3. Plates 13 at their upper end are bent outwardly to form supporting attachments for roof bows 16 which are secured to the outwardly bent portion of plates 13 by bolts 17.

The lower ends of truss posts 12 abut the floor beams 5 and are clamped thereto by angle fastenings 18 by means of bolts 19.

The wire tension members 7 are attached at their upper ends to plates 13 which are provided with holes 20 for that purpose, and the lower ends of members 7 are secured to members 5 closely adjacent the lower ends of posts 12 by means of anchor bolts 21. Turnbuckles 22 are provided to permit proper tensioning of the wires 7.

The outer ends of floor beams 5 are connected together by longitudinally extending sills 23. The roof bows 16 extend outwardly in the plane of posts 12 and are curved downwardly to provide vertical side portions 24, the lower ends of portions 24 being suitably connected to sills 23 as by angle fastenings 25.

The vehicle is provided adjacent its rear end with wheels 50. As best shown in Fig. 4 the sills 23 are interrupted at this point, the adjacent floor beams being connected by box frames 26 which form part of the lower chords. The frames 26 are set inwardly from the line of sills 23 to form wheel wells 27 and are formed with a relatively small upwardly offset portion 28 to afford vibrational clearance for the wheel axle. The frames 26 are connected by transverse beams 29. As will be clear from Fig. 1 the wheel well is positioned within a panel of the trusses so that the tension members 7 and the posts 12 are not interrupted.

In each of the bays between the members 24 is positioned a base shelf 30 which is positioned longitudinally of the vehicle and at right angles to the plane of the adjacent inclined truss. This arrangement of the shelves provides a stable base for the support of tiers of cases or the like which comprise the load as indicated in dotted lines at 32 in Fig. 3. The shelves 30 with the exception of those over the wheel wells 27 may be fastened at their inside edges to floor beams 5 by any suitable means as angle fasteners 31, and are secured adjacent their outer edges to members 24 by means of metal brackets 33. The shelves which are positioned over the wheel wells are secured at their rear edges to the adjacent posts 12 by brackets 34 similar to the brackets 33 used to secure the outer edges of these and the other shelves to the members 24.

It will be seen that the rearward inclination of the shelves 30 leaves a gap 35 between the sills 23 and the front edges of the shelves, which affords a convenient step from which the upper tier of the cases 32 may be reached.

The floor framing may be covered with any suitable type of flooring as indicated at 37 and the inclined faces of the trusses are sheathed in any suitable manner for the back support of the load as indicated at 38. A tarpaulin cover as at 39 may be applied over the roof bows 16 and members 24 to protect the load against inclement weather.

The nose portion 11 of the vehicle is preferably formed of forwardly converging trusses 40 secured to the foremost members 24 and comprising vertical posts 41, upper chords 42, upwardly curved lower chords 43, which are extensions of sills 23, and wire tension members 44, the upper and lower chords converging to an attachment with prow post 10. Roof bows 45 are connected between the upper chords 42 and member 8 which as previously described extends to prow post 10. The prow portion 11 as above described follows substantially the prow construction shown in copending application Serial No. 602,754 filed April 2, 1932, and further description thereof is not believed necessary.

I claim:

A semi-trailer vehicle, the backbone of which is a combined load carrying and draft sustaining girder, prismatic in form and of triangular cross section, said girder being made up of two longitudinal side trusses sloping toward one another vertically, having a common upper chord and spaced apart lower chords joined together by transverse beams, each of said trusses including posts connected between the lower chords and the upper chord together with diagonal tension members in the panels formed by said posts, a plurality of shelf-supporting members projecting outwardly from each of the sloping side trusses of said girder for carrying the load of said vehicle, running wheels for said vehicle hung from the base of said girder and means providing a draft connection at the front end of said girder whereby all drafting strains in the pulling of said vehicle as a semi-trailer are applied to and borne by said girder as the sole chassis frame of said vehicle.

HAROLD H. ROBINSON.